F. C. GREENE & C. G. PALMER.
CONTINUOUS CAR DUMPING MECHANISM.
APPLICATION FILED JAN. 19, 1906.

976,167.

Patented Nov. 22, 1910.
5 SHEETS—SHEET 1.

Fig. 1.

WITNESSES:
Robt. P. Millard
Jno. F. Oberlin

INVENTORS
Frank C. Greene & Charles G. Palmer
BY
J. B. Fay
ATTORNEY

F. C. GREENE & C. G. PALMER.
CONTINUOUS CAR DUMPING MECHANISM.
APPLICATION FILED JAN. 19, 1906.

976,167.

Patented Nov. 22, 1910.
5 SHEETS—SHEET 2.

F. C. GREENE & C. G. PALMER.
CONTINUOUS CAR DUMPING MECHANISM.
APPLICATION FILED JAN. 19, 1906.

976,167.

Patented Nov. 22, 1910.
5 SHEETS—SHEET 4.

WITNESSES:
Robt. P. Millard
Jno. T. Oberlin

INVENTORS
Frank C. Greene
Charles G. Palmer
BY
J. R. Fay
ATTORNEY

F. C. GREENE & C. G. PALMER.
CONTINUOUS CAR DUMPING MECHANISM.
APPLICATION FILED JAN. 19, 1906.

976,167.

Patented Nov. 22, 1910
5 SHEETS—SHEET 5.

WITNESSES:
Robt. V. Millard
Jno. F. Oberlin

INVENTORS
Frank C. Greene and Charles G. Palmer
BY
J. D. Fay
ATTORNEY

UNITED STATES PATENT OFFICE.

FRANK C. GREENE, OF CLEVELAND, AND CHARLES G. PALMER, OF EAST CLEVELAND, OHIO; SAID PALMER ASSIGNOR TO SAID GREENE.

CONTINUOUS CAR-DUMPING MECHANISM.

976,167.   Specification of Letters Patent.   Patented Nov. 22, 1910.

Application filed January 19, 1906. Serial No. 296,764.

*To all whom it may concern:*

Be it known that we, FRANK C. GREENE and CHARLES G. PALMER, both citizens of the United States, residents of Cleveland and East Cleveland, respectively, county of Cuyahoga, and State of Ohio, have invented a new and useful Improvement in Continuous Car-Dumping Mechanism, of which the following is a specification, the principle of the invention being herein explained and the best mode in which we have contemplated applying that principle, so as to distinguish it from other inventions.

Our invention relates to mechanism for handling cars, and particularly to mechanism for handling of mine cars in the tipples of coal mines. The principle of operation therein exemplified is capable, however, of much wider application, and may be advantageously employed in divers connections where the object sought is the quick and automatic dumping or emptying of material from cars.

To the accomplishment of this object our invention consists of means hereinafter fully described and particularly set forth in the claims.

The annexed drawings and the following description set forth in detail certain mechanism embodying the invention, said disclosed means constituting but one of various mechanical forms in which the principle of the invention may be used.

In said annexed drawings.

Figure 1:
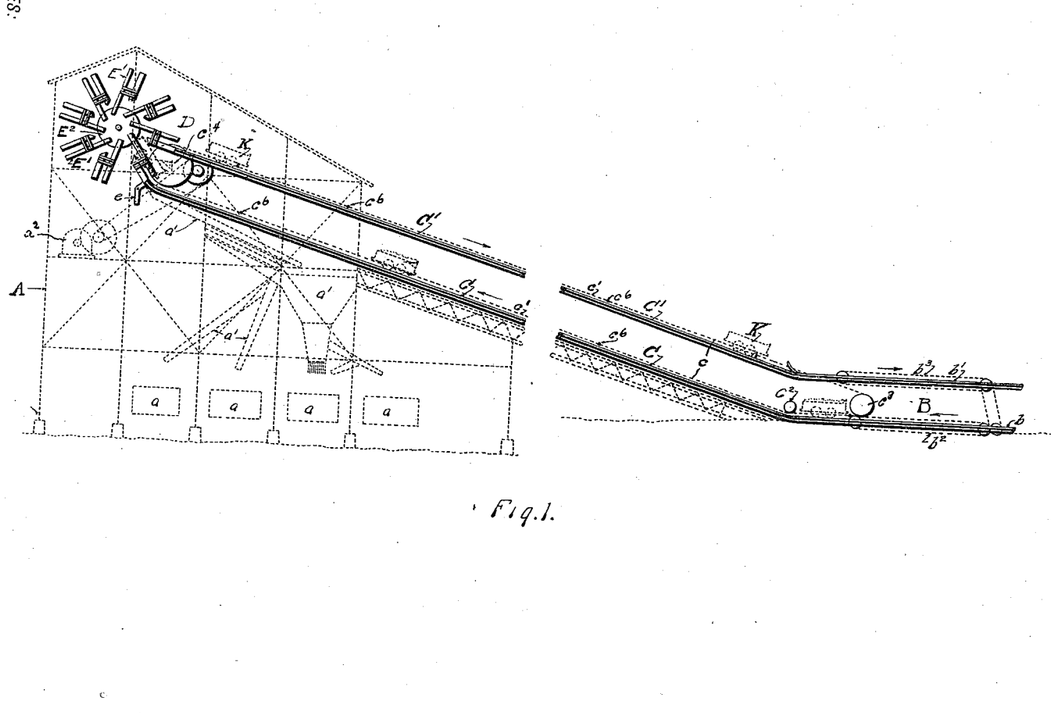
Figure 1 represents the tipple of a coal mine, shown in dotted outline, with a form of our improved car-handling mechanism installed therein.

As has been stated, Fig. 1 represents our invention as it appears when installed in the tipple of a coal mine; and, in the particular case illustrated, it is designed to receive the loaded cars at approximately the foot of the tipple structure, elevate such cars to the requisite height within such structure, there dump them, and then return them again to the former level. Such tipple structure is designated by A and, in addition to including the car-handling mechanism about to be described, provides space for railway cars $a$, or else bins, into which the coal is to be discharged, together with suitable screens and chutes $a'$ to separate the coal into its various grades and to properly divert each grade into the receptacle set apart for it. It is to accommodate these screens and chutes and allow space below them for railway cars or bins, that the ordinary tipple is such an elevated structure; and of course the coal from the mine, or in other words the mine cars, require to be introduced and dumped near the top of the structure in order to pass such coal over the screens. The particular method employed to raise the cars to this desired elevation will of course vary with the situation of the mine and tipple. The situation chosen for the purpose of this description is that where the car emerges from the mine at about the level of the foot of the tipple and hence requires to be raised to the top of the same for the reason just explained. Accordingly, leading from a feeding station B, where the cars are received from the mine and to which they are returned on the way back to the mine, we provide upwardly-inclined tracks C C', at the other end of which is the dumping station D. The feeding station B includes two superposed level track-sections $b$ and $b'$, the lower of which is designed to receive the loaded cars as they come from the mine, the upper of which is designed to return such cars to the mine after they have been emptied. These two tracks may be continued, the one above the other, to the mouth of the mine-shaft, when there happens to be a shaft; where, however, the mine is entered on an incline, both tracks would be brought, of course, to the same level before reaching the entry way of the mine, and merged into one since such entry ways are not usually wide enough to admit of double-tracking. But I omit all the switches and track connections whereby the cars are thus brought to, and conducted from, the tipple, as forming no essential part of the invention here set forth. Continuous with lower track $b$ of feeding station B is inclined track C which we shall term the car-delivery track; and continuous with the upper track $b'$ of such feeding station is the inclined track C' which we shall term the car-discharge track. The cars are moved upon the level-track sections $b$ $b'$ of the feeding station by any suitable means such as endless cables $b^2$ $b^3$ actuated to move in the proper directions and adapted to periodically engage a car. Movement of the cars up car-delivery track C and down car-discharge track C' is in the first case effected, in the latter case controlled, by means of another endless cable $c$ shown in part in Fig. 1. Such cable $c$ is made up of two separate cables or chains $c'$, one on each side of the car track Figs. 5 and 6. Each of these chains $c'$ passes around suitably disposed sheaves or sprocket-wheels $c^2$ $c^3$ at the lower ends of the tracks, and around a single large sprocket-wheel $c^4$ at the upper ends of the tracks, the diameter of such large sprocket-wheel $c^4$ being substantially equal to the distance between the two tracks at that point. Cable $c$ is driven in the direction indicated by the arrows by a motor $a^2$ or equivalent means connected with large sprocket-wheels $c^4$ as shown. The disposition of the sprocket-wheels is such as to cause the chains $c'$ to lie parallel with tracks C C' just without and a little above such tracks. Such chains are preferably made up of solid elongated links $c^5$ pivotally connected at their ends so as to be movable in a vertical plane only. At suitable intervals the adjacent portions of the two chains are connected by means of transverse bars or rods $c^6$ and on these near their ends are mounted flanged wheels $c^7$ that are adapted to travel on supplementary rails $C^2$ running alongside the rails of each of tracks C and C'.

Figure 10:
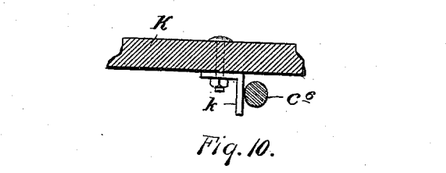
Fig. 10 represents in detail the means provided for connecting the car to such cable.

The transverse bars $c^6$, by being mounted upon wheels in the manner just described, serve to support the chains and are further adapted to be utilized to engage the cars to move them up the car-delivery track and to hold them in check in coming down the car-discharge track. To effect such engagement each car K is provided, Figs. 5 and 10, with a catch consisting of an angle iron $k$ or similar means secured transversely across its bottom and projecting downwardly far enough to be engaged by a bar $c^6$ as the cables carry such bar along.

Figure 7:
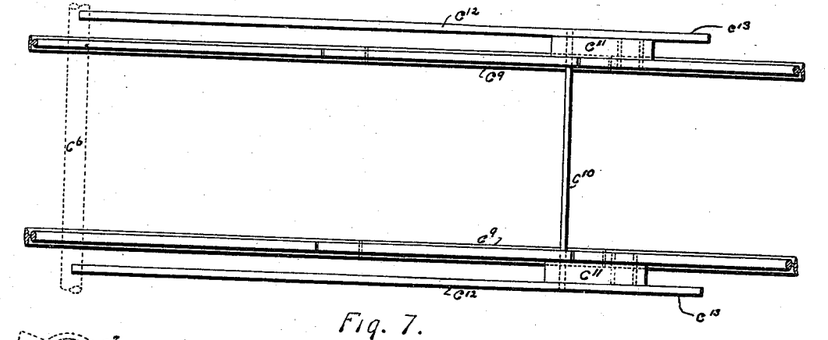
Figs. 7, 8, and 9 represent detail views of a device whereby such cable is permitted to pass from the upper to the under side of a track.
Figure 8:
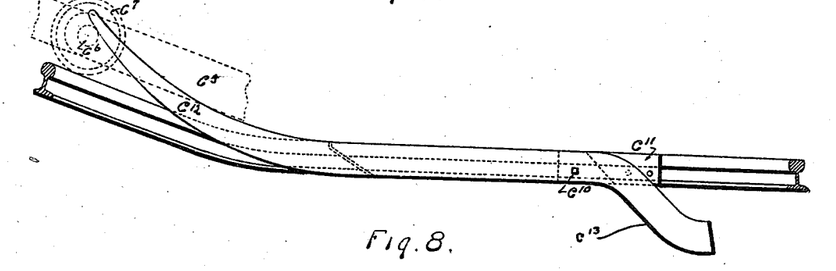
Figure 9:
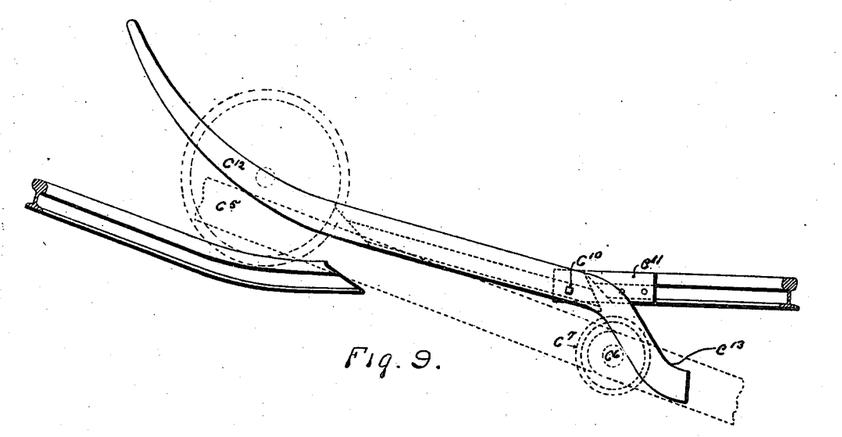

In order that cable $c$, by which term it is seen we designate the structure formed of the two parallel chains and the cross-bars connecting the same, may pass freely from the upper to the under side of car-discharge track C' at its lower end, the arrangement illustrated in Figs. 7, 8, and 9 is provided. At the point where such passage is to be effected a similar short section $c^9$ of each rail of the track is mounted at its lower forward end upon a rock-shaft $c^{10}$ pivoted in blocks $c^{11}$ and provided at its extremities with rearwardly extending trip-arms $c^{12}$. The free ends of these arms are curved upwardly and the arms themselves are so disposed as to bring such curved ends into position to be engaged by the wheels $c^7$ which have been described as being mounted upon bars $c^6$. Such engagement of arms $c^{12}$ by wheels $c^7$ raises the former and so rocks shaft $c^{10}$ to swing track-sections $c^9$ upwardly. Bar $c^6$ is permitted to glide through the break thus made in track C', which closes, however, immediately thereafter, as arms $c^{12}$ drop into place again. To insure such closure of the track it is advisable to provide more positive means than mere force of gravity. To this end, the arms $c^{12}$ are extended forwardly and downwardly to form other arms $c^{13}$. These are so positioned as to engage wheels $c^7$ of the cable as the latter moves on beneath the track, the effect of such engagement being the raising of the arms and the forcing of the track-section $c^9$ into place. The ends of track sections $c^{12}$, it will be further noted, are raised just high enough to engage the wheels of the passing car, thus obviating the use of any independently operated stop to retain the car pending the closing of such track-section.

Figure 2:
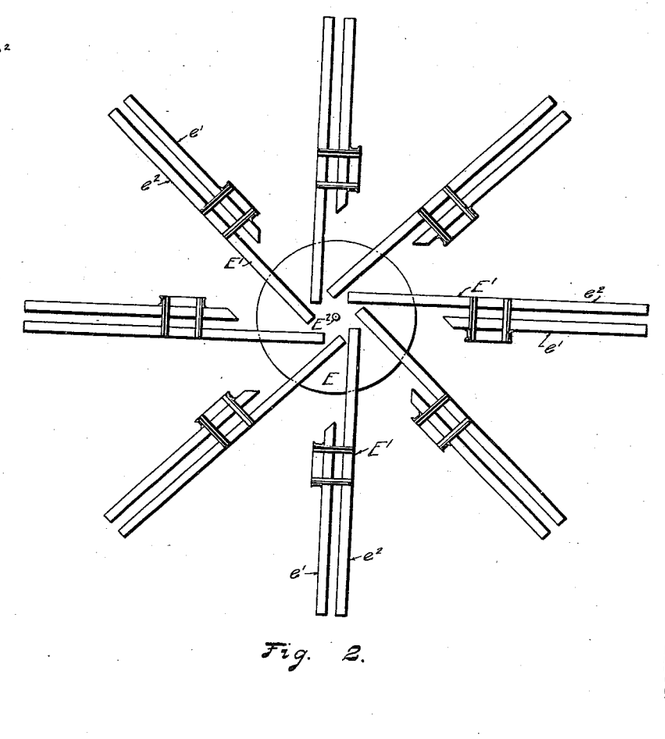
Fig. 2 is a side elevation of a combined car-transferring and dumping device that forms a feature of such mechanism.
Figure 3:
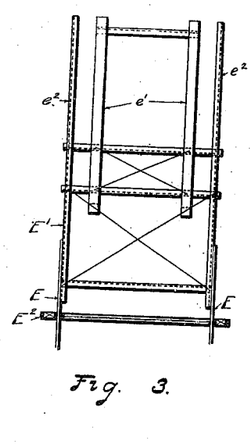
Fig. 3 is a front elevation of one of the elements composing such device.

Dumping of the loaded car, which is moved up car-delivery track C by means of cable $c$ in the manner just set forth, is effected at the dumping station D at the upper end of such track; and, simultaneously with the dumping operation, the car is transferred from the lower car-delivery track to the upper car-discharge track preparatory to its return to the feeding station B, and thence to the mine. The mechanism by which such dumping and simultaneous transfer of a car is accomplished is illustrated in its simplest form in Fig. 4, while Figs. 2 and 3 show the same elaborated into a structure that, while not essentially departing therefrom in principle of operation, is adapted to operate much more rapidly. The simple form of device thus illustrated in Fig. 4, it should be stated, is specifically claimed in a separate application filed September 6, 1907, Serial No. 391,565.

Figure 4:
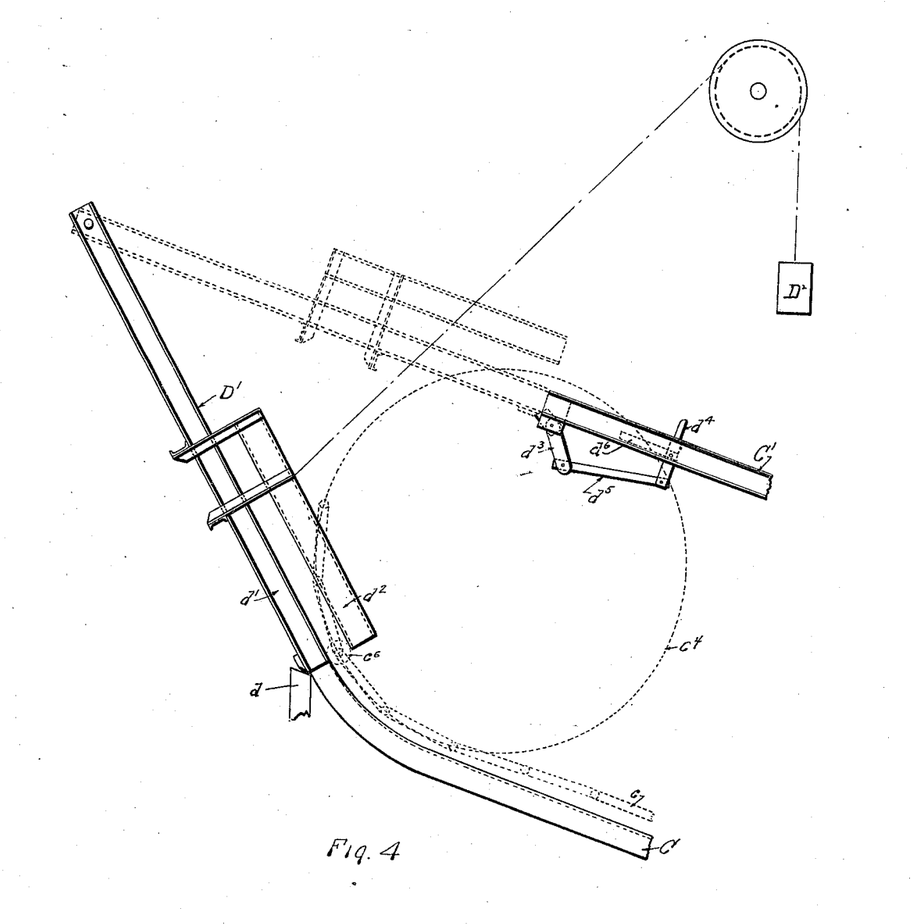
Fig. 4 represents a modification of such car-transferring and dumping device in which it is reduced to its simplest form.

Considering the device first as shown in Fig. 4, it is seen to comprise a frame D' pivotally mounted on an axis transversely disposed relatively to tracks C and C'. A counterweight $D^2$ is provided in connection with such frame, but should not suffice to overbalance it; accordingly it will normally occupy the position indicated in full lines in aforesaid figure, being retained in such position by a stop $d$. As shown, the frame in such normal position is inclined at an angle of about 60° from the horizontal; the exact degree of inclination, however, being immaterial so long as it is sufficient to cause a car when similarly inclined to readily discharge its contents. When in such normal position, the lower free end of frame D' is designed to register with the upper end of car-delivery track C which is curved upwardly to meet it, thus avoiding a sharp turn in the track. The portion $d'$ of frame D' that registers thus with the end of track C is provided with rails or equivalent means adapted to form a continuation of the rails of such track so that a car may pass readily off the track and onto the frame.

The same endless cable $c$ that is utilized to move the cars along track C, serves also to urge them off onto the inclined track-portion $d'$ of frame D'. To this end the large sheaves $c^4$ about which the cable passes are located substantially as indicated in Fig. 4 with reference to the upper curved end of track C and the lower portion of frame D' whereby the cable is maintained practically parallel with both. In addition to the track-portion $d'$, frame D' is provided with arms $d^2$, one on each side of such track and parallel therewith. These arms have a track surface on their under sides and are so disposed laterally as to present such track surface just above the wheels $c^7$ that have been described as being mounted on the outer ends of the bars $c^6$ whereby the two chains forming cable $c$ are connected. Thus, as a pair of the wheels are borne along by the cable they are brought into engagement with such arms $d^2$; the effect of such engagement as the cable begins to ascend in passing around sheaves $c^4$, it is readily seen, is to carry the whole frame upward, with the car previously deposited thereon, until it rests in the position indicated in dotted outline in the figure just referred to. In this position the free end of the frame registers with the upper end of car-discharge track C' and as the cable passes across the upper side of sheave $c^4$ and thence along the track it disengages such wheels $c^7$ from arms $d^2$, and leaves the frame free to swing back again to its normal position. Means are provided, however, whereby the frame is retained in register with track C' long enough to allow the car borne by the former to pass off onto the latter; such means comprise a latch $d^3$ positioned by means of a weighted arm $d^6$ to automatically engage the end of the frame as it swings upwardly. As the car, after leaving the frame, passes along track C', it, or rather the cross-bar $c^6$, joining the chains, which immediately precedes it, engages a trip-arm $d^4$ properly connected with latch $d^3$ by a bar $d^5$ to thereupon swing the latter out of engagement with the frame. The return of the frame to the lower position in which it rests against stop $d$ is of course controlled by the counterweight previously described.

Figure 5:
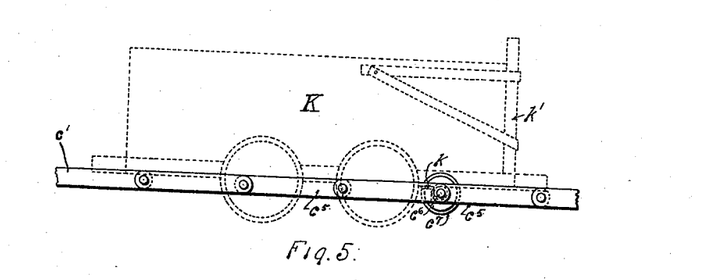
Figs. 5 and 6 are detail views of an endless cable that is employed both to move cars to and from the transferring device, and to actuate the latter.
Figure 6:
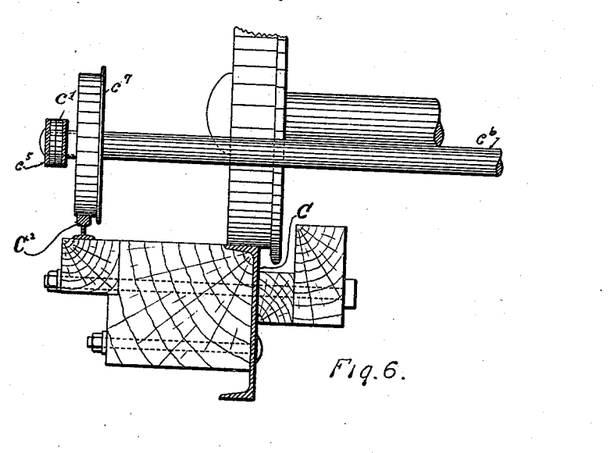

The dumping of the car is effected incidentally to its transfer from track C to track C' by simply opening its end-gate $k'$ which is preferably hinged in the manner shown in Fig. 5. Such opening of end-gate $k'$ and consequent dumping of the car may be effected manually, or automatically by mechanical means which do not appear in this specification or form a part of my present invention; it should occur, however, a little before the car reaches the oscillatory frame D' and before such frame has been engaged by the cable $c$ in order that the car may be entirely emptied before being raised to the upper level. The number and disposition of bars $c^6$, connecting chains $c'$, should be such as to permit cars to successively arrive at the upper end of car-delivery track C just a little after the frame D resumes its normal position.

It will be observed that a short interval of time is lost pending each resumption by frame D' of this normal position and the frequency with which cars can be fed upon the car-delivery track is thus limited. In order, therefore, to make possible a greater rapidity of operation we have devised the form of transferring device illustrated in Figs. 2 and 3. As will be readily apparent upon an inspection of these figures, and of Fig. 1, in conjunction therewith, this preferred form of transferring device comprises essentially a plurality of frames E' each equivalent to the previously described frame D' in every way, except that the track-portion $e'$ designed to register with tracks C and C' is shown as the member supported by the frame proper, while the lower portion $e^2$ of the frame itself is utilized to form the cable-engaging member, in contradistinction to the construction of frame D' where the opposite arrangement of these parts obtains. Such frames E' are suitably attached to a large hub E mounted upon an axis $E^2$ that occupies a position with reference to the ends of tracks C and C' similar to that occupied by the pivotal axis of frame D'. The frames E' accordingly radiate like spokes from the hub $E^2$, and their number is such and they are so spaced that when one such radial frame registers with car-discharge track C', the one following it will register with car-delivery track C. As cable $c$ in the course of its travel brings a bar $c^6$ with wheels $c^7$ thereon into engagement with member $e^2$ of the frame that happens to register with the car-delivery track, such frame will be raised into position to register with the car-discharge track, and the succeeding frame will be brought around opposite to the car-delivery track. Thus it is evident that the entire device will be gradually rotated on its axis, each passage of a cross-bar $c^6$ along the dumping station effecting its rotation through the angular distance between two successive frames. The wheel is prevented from rotating in a reverse direction by means of a latch $e$ Fig. 1, pivoted so as to lie in the path of the outer ends of the frames $E'$ and adapted to permit their movement in the desired direction only.

From the construction of the form of our transferring device just described it is seen that there is no reversal in the movement of such device and hence no delay attendant upon its return to the operative position as is the case in the simpler form first described. In fact it is capable of handling cars just twice as rapidly as is the other. While the operation of this important feature of our invention has been, perhaps, clearly enough indicated in connection with the description given of the two forms of its construction, it may be well to describe the operation of the car-handling mechanism as a whole. The cars upon their arrival from the mine are run onto track $b$ of the feeding station from which they are fed one by one upon car-delivery track C. The object of such feeding station is to insure the proper timing of the arrival of cars upon track C, since it is evident that were a car to be brought to the foot of such track just as a cross-bar of cable $c$ was descending, the consequences would be disastrous to the mechanism of the plant. Accordingly feeding-cable $b^2$, in addition to being connected to operate in unison with cable $c$, should be an aliquot part of such cable, its length being equal, in fact, to the distance between successive bars in cable $c$. From this arrangement it is evident that a car placed upon track $b$ of the feeding station will not be moved off the same until the cable $c^2$ is in proper position to receive it. The car, once it is on track C, is engaged by a cross-bar $c^6$ of cable $c$ and thereby carried up the inclined portion of the track; upon its arrival at the track's upper end, it is pushed upon the more sharply inclined track-section of frame $D'$ or $E'$, according as to which type of transferring device is being employed. Just previous to its arrival on such frame, however, the end-gate of the car is raised and its load discharged, while by the time that it is wholly on the frame, the engagement of the wheels $c^7$ on the particular cross-bar $c^6$ that has moved the car, with arms $d^2$ or $e^2$, swings the aforesaid frame upwardly and into register with the upper car-discharge track $C'$. Along this track the cable $c$, having passed around sheaves $c^4$, of course runs in the opposite direction. Wheels $c^7$ are accordingly withdrawn from beneath the arms of the frame and such frame and track being still on an incline, the car follows and moves down the track as fast as the cable will allow it. At the lower end of track $C'$ the cable passes below the same and around lower sheaves $c^2$, $c^3$, the cross-bars being allowed to pass beneath the track by means of the device shown in Figs. 7, 8 and 9.

Where just a single vibratory frame $D'$ is employed at the dumping station, cross-bars $c^6$ must be spaced sufficiently far apart to allow the frame to swing back into its normal position before the arrival of a second car. When, however, a series of radially mounted frames $E'$ is used, a second frame is in position to receive the following car as soon as the first frame with the first car is in register with the discharge track, as will be readily understood. In either case it is seen that the cable by means of such cross-bars serves to move the cars to the upper end of the car-delivery track, there place them upon the transferring frame, and while retaining them thereon, swing such frame upwardly into alinement with the car-discharge track. On the car-discharge track the same cable serves to hold the cars in check, finally allowing them to run off onto the upper track of the feeding station.

The various advantageous features of our system of handling and dumping cars have been sufficiently indicated in passing. It should be pointed out, however, that considerable modification can be made of such system, and especially of the car-delivery and car-discharge tracks, without departing from the spirit of the invention. Such suggested modification might in fact be required to adapt our system for use in other situations than the one here chosen for illustration, where the mine happened to be differently situated with reference to the tipple.

Having thus described our invention in detail, that which we particularly point out and distinctly claim is:

1. In mechanism of the class described, the combination of an endless cable, a carrier member adapted to be conveyed thereby, and a transfer device adapted to receive said carrier member from one portion of said cable and place the same on another portion thereof, said cable being constructed to operate said transfer device.

2. In mechanism of the class described, the combination of an endless cable, a carrier member adapted to be conveyed thereby, and a transfer device adapted to receive said carrier member from one portion of said cable and place the same on another portion thereof, said cable being constructed to periodically operate said transfer device.

3. In mechanism of the class described, the combination of a sheave, a cable passing around the same, a carrier member adapted to be conveyed by said cable, and a transfer device adapted to receive said carrier member from the portion of said cable on one side of said sheave and to place the same on the portion of said cable on the other side thereof.

4. In mechanism of the class described, the combination of a vertically disposed sheave, a cable passing around the same, a carrier member adapted to be conveyed by said cable, and a transfer device adapted to receive said carrier member from the portion of said cable on one side of said sheave and place the same, same side up, on the portion of said cable on the other side of said sheave.

5. In mechanism of the class described, the combination of a vertically disposed sheave, a cable passing around the same, a carrier member adapted to be conveyed by said cable, and a transfer device adapted in its lower position to receive said carrier member from the portion of said cable on the lower side of said sheave, and in its upper position to place said member, same side up, on the portion of said cable on the upper side of said sheave.

6. In mechanism of the class described, the combination of a vertically disposed sheave, a cable passing around the same, a carrier member adapted to be conveyed by said cable, and a transfer device adapted in its lower position to receive said carrier member from the portion of said cable on the lower side of said sheave, and in its upper position to place said member, same side up, on the portion of said cable on the upper side of said sheave, said cable being adapted to periodically actuate said transfer device.

7. The combination of superposed ways; carrier members movable along the same; and a rotatable transfer device adapted, upon rotation, to register with each of said ways.

8. The combination of superposed ways; carrier members movable along the same; a cable for thus moving said carrier members; and a rotatable transfer device adapted, upon rotation, to register with each of said ways, said cable being connected to thus rotate said device.

9. The combination of superposed ways; carrier members movable along the same; a cable for thus moving said carrier members; and a pivotal transfer device adapted to register with each of said ways, said cable being connected to actuate said device.

10. The combination with a car-haul including an endless cable and cars movable thereby; of a transfer device, apart from said car-haul, adapted to receive a car from one portion of such cable and place the same on another portion thereof, said cable being connected to operate said transfer device.

11. The combination with a car-haul including an endless cable and cars movable thereby; of a transfer device, apart from said car-haul, adapted to receive a car from one portion of such cable and place the same on another portion thereof, said cable being connected to periodically operate said transfer device.

12. The combination with a car-haul including superposed tracks, an endless cable passing along the same, and cars movable on said tracks by said cable; of a transfer device, apart from said car-haul, adapted to receive a car from one of said tracks and place the same on the other, said cable being adapted to actuate said transfer device.

13. The combination with a car-haul including superposed tracks, an endless cable passing along the same, and cars movable on said tracks by said cable; of a transfer device, apart from said car-haul, adapted to receive a car from one of said tracks and place the same on the other, said cable being adapted to actuate said transfer device, and the latter being adapted to dump a car of its contents incidentally to the reception of such car thereon.

14. The combination of two superposed tracks, means adapted to transfer a car from one of said tracks to the other, and a cable adapted to move a car upon said tracks and to periodically engage and actuate said transferring means.

15. In car-handling mechanism, the combination of a plurality of tracks; a movable car-transferring member adapted to successively register with each of said tracks; and a cable adapted to periodically engage and actuate said member.

16. In car-handling mechanism, the combination of two tracks; a movable car-transferring member adapted in one position to register with one of said tracks and in another position to register with the other thereof; and an endless cable adapted to periodically engage said member and move it from one such position to the other.

17. In car-handling mechanism, the combination of two tracks; a movable car-transferring member adapted in one position to register with one of said tracks and in another position to register with the other thereof; and an endless cable passing along said tracks and adjacent to said member, such cable being adapted to move cars upon said tracks and to periodically engage and actuate said member.

18. In car-handling mechanism, the combination of two tracks, a pivotally mounted car-transferring member adapted in one position to register with one of said tracks and in another position to register with the other thereof, and an endless cable adjacent to said member and adapted to periodically engage the same and move it from one such position to the other.

19. In car-handling mechanism, the combination with two tracks, a pivotally mounted car-transferring member adapted in one position to register with one of said tracks and in another position to register with the other thereof; and a cable passing transversely of the free end of said member, such cable being adapted to periodically engage and actuate said member.

20. In car-handling mechanism, the combination of two tracks; a pivotally mounted car-transferring member adapted in one position to register with one of said tracks and in another position to register with the other thereof; and an endless cable passing along said tracks and transversely of the free end of said member, such cable being adapted to move cars upon said tracks and to periodically engage and actuate said member.

21. In car-handling mechanism, the combination of superposed tracks; means adapted to transfer a car from one of said tracks to the other, and a cable adapted to periodically engage and actuate said means.

22. In car-handling mechanism, the combination of superposed tracks; a movable car-transferring member adapted to successively register with each of said tracks; and a cable adapted to periodically engage and actuate said member.

23. In car-handling mechanism, the combination of two superposed tracks; a movable car-transferring member adapted to successively register with each of said tracks; and an endless cable adapted to move cars upon said tracks and to periodically engage and actuate said member.

24. The combination of two superposed tracks; a movable car-transferring member adapted in one position to register with one of said tracks and in another position to register with the other thereof; and a cable adapted to move a car off such first track onto said member, and thereupon to engage said member and move the same into register with said second track.

25. In car-handling mechanism, the combination of superposed tracks; a pivotally mounted car-transferring member adapted to successively register with each of said tracks, and a cable adjacent to said member and adapted to periodically engage and actuate the same.

26. In car-handling mechanism, the combination of two superposed tracks, a pivotally mounted car-transferring member adapted to successively register with each of said tracks, and a cable passing along said tracks and adjacent to said member, such cable being adapted to move cars upon said tracks and to engage and actuate said member.

27. In car-handling mechanism, the combination of two superposed tracks; a pivotally mounted car-transferring member adapted in one position to register with one of said tracks and in another position to register with the other thereof; and an endless cable passing along said tracks and transversely of the free end of said member, such cable being adapted to move cars upon said tracks and to periodically engage and actuate said member.

28. In car-handling mechanism, the combination of two superposed tracks; a pivotally mounted car-transferring member adapted in one position to register with one of said tracks and in another position to register with the other thereof; and a cable adapted to move a car off such first track onto said member, and thereupon to engage the free end of said member and move the same into register with said second track.

29. The combination of a track; a track-section registering therewith and inclining upwardly therefrom, whereby a car received thereon is adapted to be dumped of its contents; and an endless cable adapted to periodically engage a car upon said track and move the same onto said inclined track-section.

30. The combination of two tracks; a movable track-section adapted in one position to register with one of said tracks and in another position to register with the other thereof, said track-section when in register with said first track inclining upwardly therefrom, whereby a car received thereon is adapted to be dumped of its contents; and an endless cable adapted to move a car off said first track onto said track-section and thereupon to engage the latter and move the same into register with said second track.

31. The combination of two tracks; a pivotally mounted track-section adapted in one position to register with one of said tracks and in another position to register with the other thereof, said track-section when in register with said first track inclining upwardly therefrom, whereby a car received thereon is adapted to be dumped of its contents; and an endless cable adapted to periodically move a car off said first track onto said track-section and thereupon to engage the latter and move the same into register with said second track.

32. In car-handling mechanism, the combination with two similarly inclined superposed tracks, of a pivotally mounted track-section adapted in one position to register with one of said tracks and in another position to register with the other thereof, said track-section inclining in the same general direction as said tracks in each position.

33. In car-handling mechanism, the combination with two similarly inclined superposed tracks, of a pivotally mounted track-section adapted to register with said tracks, respectively, the pivotal axis of said trackber from the portion of said cable on one side of said sheave and to place the same on the portion of said cable on the other side thereof.

4. In mechanism of the class described, the combination of a vertically disposed sheave, a cable passing around the same, a carrier member adapted to be conveyed by said cable, and a transfer device adapted to receive said carrier member from the portion of said cable on one side of said sheave and place the same, same side up, on the portion of said cable on the other side of said sheave.

5. In mechanism of the class described, the combination of a vertically disposed sheave, a cable passing around the same, a carrier member adapted to be conveyed by said cable, and a transfer device adapted in its lower position to receive said carrier member from the portion of said cable on the lower side of said sheave, and in its upper position to place said member, same side up, on the portion of said cable on the upper side of said sheave.

6. In mechanism of the class described, the combination of a vertically disposed sheave, a cable passing around the same, a carrier member adapted to be conveyed by said cable, and a transfer device adapted in its lower position to receive said carrier member from the portion of said cable on the lower side of said sheave, and in its upper position to place said member, same side up, on the portion of said cable on the upper side of said sheave, said cable being adapted to periodically actuate said transfer device.

7. The combination of superposed ways; carrier members movable along the same; and a rotatable transfer device adapted, upon rotation, to register with each of said ways.

8. The combination of superposed ways; carrier members movable along the same; a cable for thus moving said carrier members; and a rotatable transfer device adapted, upon rotation, to register with each of said ways, said cable being connected to thus rotate said device.

9. The combination of superposed ways; carrier members movable along the same; a cable for thus moving said carrier members; and a pivotal transfer device adapted to register with each of said ways, said cable being connected to actuate said device.

10. The combination with a car-haul including an endless cable and cars movable thereby; of a transfer device, apart from said car-haul, adapted to receive a car from one portion of such cable and place the same on another portion thereof, said cable being connected to operate said transfer device.

11. The combination with a car-haul including an endless cable and cars movable thereby; of a transfer device, apart from said car-haul, adapted to receive a car from one portion of such cable and place the same on another portion thereof, said cable being connected to periodically operate said transfer device.

12. The combination with a car-haul including superposed tracks, an endless cable passing along the same, and cars movable on said tracks by said cable; of a transfer device, apart from said car-haul, adapted to receive a car from one of said tracks and place the same on the other, said cable being adapted to actuate said transfer device.

13. The combination with a car-haul including superposed tracks, an endless cable passing along the same, and cars movable on said tracks by said cable; of a transfer device, apart from said car-haul, adapted to receive a car from one of said tracks and place the same on the other, said cable being adapted to actuate said transfer device, and the latter being adapted to dump a car of its contents incidentally to the reception of such car thereon.

14. The combination of two superposed tracks, means adapted to transfer a car from one of said tracks to the other, and a cable adapted to move a car upon said tracks and to periodically engage and actuate said transferring means.

15. In car-handling mechanism, the combination of a plurality of tracks; a movable car-transferring member adapted to successively register with each of said tracks; and a cable adapted to periodically engage and actuate said member.

16. In car-handling mechanism, the combination of two tracks; a movable car-transferring member adapted in one position to register with one of said tracks and in another position to register with the other thereof; and an endless cable adapted to periodically engage said member and move it from one such position to the other.

17. In car-handling mechanism, the combination of two tracks; a movable car-transferring member adapted in one position to register with one of said tracks and in another position to register with the other thereof; and an endless cable passing along said tracks and adjacent to said member, such cable being adapted to move cars upon said tracks and to periodically engage and actuate said member.

18. In car-handling mechanism, the combination of two tracks, a pivotally mounted car-transferring member adapted in one position to register with one of said tracks and in another position to register with the other thereof, and an endless cable adjacent to said member and adapted to periodically engage the same and move it from one such position to the other.

19. In car-handling mechanism, the combination with two tracks, a pivotally mounted car-transferring member adapted in one position to register with one of said tracks and in another position to register with the other thereof; and a cable passing transversely of the free end of said member, such cable being adapted to periodically engage and actuate said member.

20. In car-handling mechanism, the combination of two tracks; a pivotally mounted car-transferring member adapted in one position to register with one of said tracks and in another position to register with the other thereof; and an endless cable passing along said tracks and transversely of the free end of said member, such cable being adapted to move cars upon said tracks and to periodically engage and actuate said member.

21. In car-handling mechanism, the combination of superposed tracks; means adapted to transfer a car from one of said tracks to the other, and a cable adapted to periodically engage and actuate said means.

22. In car-handling mechanism, the combination of superposed tracks; a movable car-transferring member adapted to successively register with each of said tracks; and a cable adapted to periodically engage and actuate said member.

23. In car-handling mechanism, the combination of two superposed tracks; a movable car-transferring member adapted to successively register with each of said tracks; and an endless cable adapted to move cars upon said tracks and to periodically engage and actuate said member.

24. The combination of two superposed tracks; a movable car-transferring member adapted in one position to register with one of said tracks and in another position to register with the other thereof; and a cable adapted to move a car off such first track onto said member, and thereupon to engage said member and move the same into register with said second track.

25. In car-handling mechanism, the combination of superposed tracks; a pivotally mounted car-transferring member adapted to successively register with each of said tracks, and a cable adjacent to said member and adapted to periodically engage and actuate the same.

26. In car-handling mechanism, the combination of two superposed tracks, a pivotally mounted car-transferring member adapted to successively register with each of said tracks, and a cable passing along said tracks and adjacent to said member, such cable being adapted to move cars upon said tracks and to engage and actuate said member.

27. In car-handling mechanism, the combination of two superposed tracks; a pivotally mounted car-transferring member adapted in one position to register with one of said tracks and in another position to register with the other thereof; and an endless cable passing along said tracks and transversely of the free end of said member, such cable being adapted to move cars upon said tracks and to periodically engage and actuate said member.

28. In car-handling mechanism, the combination of two superposed tracks; a pivotally mounted car-transferring member adapted in one position to register with one of said tracks and in another position to register with the other thereof; and a cable adapted to move a car off such first track onto said member, and thereupon to engage the free end of said member and move the same into register with said second track.

29. The combination of a track; a track-section registering therewith and inclining upwardly therefrom, whereby a car received thereon is adapted to be dumped of its contents; and an endless cable adapted to periodically engage a car upon said track and move the same onto said inclined track-section.

30. The combination of two tracks; a movable track-section adapted in one position to register with one of said tracks and in another position to register with the other thereof, said track-section when in register with said first track inclining upwardly therefrom, whereby a car received thereon is adapted to be dumped of its contents; and an endless cable adapted to move a car off said first track onto said track-section and thereupon to engage the latter and move the same into register with said second track.

31. The combination of two tracks; a pivotally mounted track-section adapted in one position to register with one of said tracks and in another position to register with the other thereof, said track-section when in register with said first track inclining upwardly therefrom, whereby a car received thereon is adapted to be dumped of its contents; and an endless cable adapted to periodically move a car off said first track onto said track-section and thereupon to engage the latter and move the same into register with said second track.

32. In car-handling mechanism, the combination with two similarly inclined superposed tracks, of a pivotally mounted track-section adapted in one position to register with one of said tracks and in another position to register with the other thereof, said track-section inclining in the same general direction as said tracks in each position.

33. In car-handling mechanism, the combination with two similarly inclined superposed tracks, of a pivotally mounted track-section adapted to register with said tracks, respectively, the pivotal axis of said track-section being located above the level of the upper of said tracks.

34. In car-handling mechanism, the combination with two similarly-inclined superposed tracks; a pivotally mounted track-section adapted to register with said tracks, respectively, the pivotal axis of said track-section being transversely disposed with respect to said tracks and being located above the level of the upper thereof; and a cable adapted to periodically engage and actuate said track-section.

35. In car-handling mechanism, the combination of two similarly-inclined superposed tracks; a pivotally mounted track-section adapted to register with said tracks, respectively, the pivotal axis of said track-section being transversely disposed with respect to said tracks and being located above the level of the upper thereof; and a cable passing along said tracks and transversely of the free end of said track-section, such cable being adapted to move a car upon said tracks and to periodically engage and actuate said track-section.

36. In car-handling mechanism, the combination with two upwardly inclined superposed tracks, of a pivotally mounted track-section adapted to register with the upper ends of said tracks, respectively; the pivotal axis of said track-section being transversely disposed with respect to said tracks and being located above the level of the upper thereof.

37. In car-handling mechanism, the combination of two upwardly inclined superposed tracks; a pivotally mounted track-section adapted to register with the upper ends of said tracks, respectively, the pivotal axis of said track-section being located above the upper of said tracks; and a continuously moving cable passing upwardly along the lower of said tracks, transversely of the free end of said track section, and downwardly along the upper of said tracks, said cable being adapted to engage cars upon said tracks and to periodically engage and actuate said track-section.

38. The combination with a plurality of tracks, of car-transferring means comprising a pivotally mounted device provided with projecting track-bearing arms respectively adapted to register with each of said tracks, and a cable adapted to periodically engage and actuate said device.

39. The combination of a plurality of tracks; a rotatable device provided with projecting track-bearing arms respectively adapted to register with each of said tracks; and a cable adapted to intermittently progressively rotate said device.

40. The combination of two tracks; a rotatable device provided with projecting track-bearing arms respectively adapted to register with each of said tracks; and a cable adapted to move cars upon said tracks and to intermittently progressively rotate said device.

41. The combination of a car-delivery track; a car-discharge track; means adapted to transfer cars from said delivery to said discharge track, such means comprising a rotatable device provided with projecting frames adapted to successively register with said tracks; and a cable adapted to move a car off said delivery track onto the frame registering therewith and thereupon to engage such frame to partially rotate said transferring device whereby such frame is brought into register with said discharge track.

42. The combination with two superposed tracks; of a rotatable device provided with projecting track-bearing arms respectively adapted to register with each of said tracks upon rotation of said device.

43. The combination with two superposed tracks; of a rotatable device mounted on an axis transversely disposed with respect to said tracks, and provided with projecting track-bearing arms respectively adapted to register with each of said tracks.

44. The combination of two superposed tracks; a rotatable device mounted on an axis transversely disposed with respect to said tracks and provided with projecting track-bearing arms respectively adapted to register with each of said tracks; and means adapted to intermittently progressively rotate said device.

45. The combination of two superposed tracks; a rotatable device mounted on an axis transversely disposed with respect to said tracks and provided with projecting track-bearing arms respectively adapted to register with each of said tracks; and a cable adapted to move cars upon said tracks and to intermittently progressively rotate said device.

46. In car-handling mechanism, the combination of two superposed tracks; means adapted to transfer cars from one of said tracks to the other, such means comprising a rotatable device provided with radially projecting frames respectively adapted to register with each of said tracks; and a cable adapted to move a car off of one of said tracks onto the frame registering therewith and thereupon to engage such frame to rotate said transferring device, whereby such frame is brought into register with the other of said tracks.

47. The combination of a car-delivery track; a car-discharge track above said car-delivery track; means adapted to transfer cars from said delivery to said discharge track, such means comprising a device rotatably mounted upon an axis transversely disposed relatively to said tracks, and provided with radially projecting frames adapted to successively register with said tracks; and an endless cable adapted to periodically move a car off said delivery track onto the frame registering therewith and thereupon to engage such frame to partially rotate said transferring device whereby such frame is brought into register with said discharge track and the next succeeding frame into register with said delivery track.

48. The combination of a car-delivery track; a car-discharge track above said car-delivery track; means adapted to transfer cars from said delivery track to said discharge track, such means comprising a device rotatably mounted upon an axis transversely disposed relatively to said tracks, and provided with radially projecting frames adapted to successively register with said tracks, the disposition of said axis being such that the frame registering with said delivery track inclines upwardly therefrom; and an endless cable adapted to move a car off said delivery track onto the frame registering therewith and thereupon to engage such frame to partially rotate said transferring device whereby such frame is brought into register with said discharge track and the next succeeding frame into register with said delivery track.

49. In car-handling mechanism, the combination with two similarly inclined superposed tracks, of a rotatable device provided with projecting track-bearing arms respectively adapted to register with each of said tracks, the axis of said device being located above the level of the upper of said tracks.

50. In car-handling mechanism, the combination of two similarly inclined superposed tracks; a rotatable device provided with projecting track-bearing arms respectively adapted to register with each of said tracks, the axis of said device being located above the level of the upper of said tracks; and a cable adapted to intermittently progressively rotate said device.

51. In car-handling mechanism, the combination of two similarly inclined superposed tracks; a rotatable device provided with projecting track-bearing arms respectively adapted to register with each of said tracks, the axis of said device being located above the level of the upper of said tracks; and a cable adapted to move cars upon said tracks and to intermittently progressively rotate said device.

52. In car-handling mechanism, the combination of two upwardly inclined superposed tracks; a rotatable device provided with projecting track-bearing arms respectively adapted to register with the upper end of each of said tracks, the axis of said device being located above the upper of said tracks; and a continuously moving cable passing upwardly along the lower of said tracks, transversely across the free ends of the arms of said rotatable device, and downwardly along the upper of said tracks; said cable being adapted to engage cars upon said tracks and to intermittently progressively rotate said device.

53. In mechanism of the class described, the combination with a track and inter-connected cables moving along the same, the connections between said cables extending across said tracks; of a movable section in said track adapted in one position to permit the movement of cars along the latter and in another position the passage of such cable connections therethrough.

54. In mechanism of the class described, the combination with a track and inter-connected cables moving along the same, the connections between said cables extending across said track; of a movable section in said track automatically operable by said cables to permit the passage of such cable connections through said track.

55. In mechanism of the class described, the combination with a track and inter-connected cables moving along the same, the connections between said cables extending across said track; of a movable section in said track adapted in one position to permit the movement of cars along the latter and in another position to permit the passage of such cable connections therethrough, said cables being adapted to position said section.

56. In mechanism of the class described, the combination with a track and parallel cables moving along the same, said cables being connected by transverse bars; of a movable section in said track adapted in one position to permit the movement of cars along the latter and in another position the passage of such cables therethrough.

57. In mechanism of the class described, the combination with a track and parallel cables moving along the same, said cables being connected by transverse bars; of an oscillatory section in said track adapted in normal position to permit the movement of cars along the track and in raised position to permit the passage of such cables therethrough.

58. In mechanism of the class described, the combination with a track and parallel cables moving along the same, said cables being connected by transverse bars; of an oscillatory section in said track adapted in normal position to permit the movement of cars along the track and in raised position to permit the passage of such cables therethrough, the latter being adapted to automatically raise said track-section.

59. In car-handling mechanism, the combination with parallel cables connected by transverse bars, of means for passing said cables through a track, such means comprising a track-section mounted upon a transversely disposed rock-shaft, and an arm mounted upon said shaft and adapted to be engaged by such transverse bars.

60. In car-handling mechanism, the combination with parallel endless cables lying without the rails of a track and connected by transverse bars, of means for passing said cables through such track, such means comprising a track-section mounted upon a transversely disposed rock-shaft, and a rearwardly projecting rock-arm adapted to be engaged by such transverse bars, whereby such track section is swung upwardly.

61. In car-handling mechanism, the combination with parallel endless cables lying without the rails of a track and connected by transverse bars, of means for passing said cables through such track, such means comprising a track-section mounted upon a transversely disposed rock-shaft, a rearwardly projecting rock-arm adapted to be engaged by such transverse bars, whereby such track-section is swung upwardly, and a forwardly-extending rock-arm adapted to be engaged by such transverse bars after passing through the track, whereby such track section is swung back into place.

62. In car-handling mechanism, the combination with a track, of an endless cable adapted to periodically engage and move a car upon one section of said track, and a second endless cable adapted to periodically engage and move a car upon another section of said track continuous with said first section, said second cable being an aliquot part of said first cable and being connected to travel in unison therewith.

63. In car-handling mechanism, the combination of a track; inter-connected endless cables moving along said track, the connections between said cables being regularly spaced and adapted to engage cars on said track; and means adapted to periodically feed cars onto said track in timed relation to the movement of said cables.

64. In car-handling mechanism, the combination of a track; inter-connected endless cables moving along one section of said track, the connections between said cables being regularly spaced and adapted to engage cars on said track-section; and another endless cable moving along an adjacent track-section and adapted to periodically engage and feed a car onto said first section, said last-named cable being an aliquot part of said inter-connected cables and traveling in unison therewith.

65. The combination of two superposed tracks, an endless cable disposed along said tracks, such cable comprising two parallel endless chains and cross bars joining the same at intervals, whereby such cable is adapted to periodically engage and move a car upon said tracks, and means adapted to transfer a car from one of said tracks to the other.

66. The combination of two superposed tracks, an endless cable disposed along said tracks, such cable comprising two parallel endless chains and cross bars joining the same at intervals, whereby such cable is adapted to periodically engage and move a car upon said tracks, and means adapted to transfer a car from one of said tracks to the other, such means being adapted to be operated by said cable.

67. The combination of two superposed tracks; means for periodically engaging and moving a car upon said tracks, such means comprising two parallel endless cables disposed along said tracks and cross-bars joining the same at intervals; and a pivotally mounted frame registering with one of said tracks and adapted to register with the other thereof, the cross-bars joining said cables being disposed so as to engage and actuate said frame.

68. The combination of two superposed tracks; means for periodically engaging and moving a car upon said tracks, such means comprising two parallel endless cables disposed along said tracks and cross-bars joining the same at intervals; and a pivotally mounted track-bearing frame registering with one of said tracks and adapted to register with the other thereof, such frame being provided with arms and the cross-bars joining said cables being disposed so as to engage said arms and thereby actuate said frame.

69. The combination of two superposed tracks; a rotatable device provided with track-bearing arms respectively adapted to register with each of said tracks; and means for moving cars upon said tracks comprising two parallel endless cables disposed along said tracks and cross-bars joining the same at intervals, said cross-bars being adapted to engage successive track-bearing arms to intermittently progressively rotate said device.

70. The combination with a car-haul including two tracks and an endless cable disposed to run along said tracks and adapted to engage cars thereon; of means at one end of said haul adapted to feed cars onto one of said tracks; and means removed from such haul end and adapted to transfer cars from such first track to the second track.

71. The combination with a car-haul including two tracks and an endless cable disposed to run along said tracks and adapted to engage cars thereon; of means at one end of said haul adapted to periodically feed a car onto one of said tracks; and means at the other end of said haul adapted to transfer cars from such first to the second track.

72. The combination with an inclined car-haul including two superposed tracks and an endless cable disposed to run along said tracks and adapted to engage cars thereon; of means at the foot of said haul adapted to feed cars onto one of said tracks; and means removed from such foot adapted to transfer cars from such first track to the second track.

73. The combination with an inclined car-haul including two superposed tracks and an endless cable disposed to run along said tracks and adapted to engage cars thereon; of means at the foot of said haul adapted to periodically feed a car onto the lower of said tracks; and means at the top of said haul adapted to transfer cars from such lower to the upper track.

74. The combination with a car-haul including two superposed tracks, and inter-connected endless cables disposed to run along said tracks, the connections between said cables being adapted to engage cars on said tracks; of means at one end of said haul adapted to feed cars onto one of said tracks; means adapted to transfer cars from such first track to the second track; and means for passing said cables and their connections through the upper of said tracks.

75. The combination with a car-haul including two superposed tracks, and inter-connected endless cables disposed to run along said tracks, the connections between said cables being adapted to engage cars on said tracks; of means at one end of said haul adapted to periodically feed cars onto the lower of said tracks; means at the other end of said haul adapted to transfer cars from such lower to the upper track; and means for passing said cables and their connections through the upper track.

76. The combination with an inclined car-haul including two superposed tracks, and inter-connected endless cables disposed to run along said tracks, the connections between said cables being regularly spaced and adapted to engage cars on said tracks; of means at the lower end of said haul adapted to periodically feed cars onto the lower of said tracks in timed relation to the movement of said cables; means at the top of said haul adapted to transfer cars from such lower to the upper track; and means for passing said cables and their connections through the upper track at a point adjacent to said feeding means.

77. The combination with a car-haul including two superposed tracks, and parallel endless cables disposed to run along said tracks and connected by transverse bars adapted to engage cars on said tracks; of means at one end of said haul for transferring cars from the one to the other of said tracks; and means intermediate between the ends of said haul, for passing said cables through one of said tracks.

78. The combination with a car-haul including two superposed tracks and parallel endless cables disposed to run along said tracks and connected by transverse bars adapted to engage cars on said tracks; of means at one end of said haul adapted to receive a car from the lower of said tracks and place the same, right side up, on the upper of said tracks; and means intermediate between the ends of said haul, for passing said cables through one of said tracks.

79. The combination with a car-haul including two tracks and an endless cable disposed to run along said tracks and adapted to engage cars thereon; of means at one end of said haul adapted to feed cars onto one of said tracks; and means removed from such haul end and adapted to transfer cars from such first track to the second track, and incidentally to dump the same.

80. The combination with a car-haul including two tracks and an endless cable disposed to run along said tracks and adapted to engage cars thereon; of means at one end of said haul adapted to periodically feed a car onto one of said tracks; and means at the other end of said haul adapted to transfer cars from such first to the second track, and incidentally to dump the same.

81. The combination with an inclined car-haul including two superposed tracks and an endless cable disposed to run along said tracks and adapted to engage cars thereon; of means at the foot of said haul adapted to feed cars onto one of said tracks; and means removed from such foot adapted to transfer cars from such first track to the second track, and incidentally to dump the same.

82. The combination with an inclined car-haul including two superposed tracks and an endless cable disposed to run along said tracks and adapted to engage cars thereon; of means at the foot of said haul adapted to periodically feed a car onto the lower of said tracks; and means at the top of said haul adapted to transfer cars from such lower to the upper track, and incidentally to dump the same.

83. The combination with a car-haul including two superposed tracks, and inter-connected endless cables disposed to run along said tracks, the connection between said cables being adapted to engage cars on said tracks; of means at one end of said haul adapted to feed cars onto one of said tracks; means adapted to transfer cars from such first track to the second track and incidentally to dump the same; and means for passing said cables and their connections through the upper of said tracks.

84. The combination with a car-haul including two superposed tracks, and inter-connected endless cables disposed to run along said tracks, the connections between said cables being adapted to engage cars on said tracks; of means at one end of said haul adapted to periodically feed cars onto the lower of said tracks; means at the other end of said haul adapted to transfer cars from such lower to the upper track and incidentally to dump the same; and means for passing said cables and their connections through the upper track.

85. The combination with an inclined car-haul including two superposed tracks, and inter-connected endless cables disposed to run along said tracks, the connections between said cables being regularly spaced and adapted to engage cars on said tracks; of means at the lower end of said haul adapted to periodically feed cars onto the lower of said tracks in timed relation to the movement of said cables; means at the top of said haul adapted to transfer cars from such lower to the upper track and incidentally to dump the same; and means for passing said cables and their connections through the upper track at a point adjacent to said feeding means.

Signed by us, this 3d day of January 1905.

F. C. GREENE.
C. G. PALMER.

Attested by—
O. V. GREENE,
G. M. GARRETT.